(12) United States Patent
Fenton

(10) Patent No.: US 11,904,587 B2
(45) Date of Patent: Feb. 20, 2024

(54) METHOD OF MANUFACTURING A CARGO BODY PANEL

(71) Applicant: STI Holdings, Inc., Stoughton, WI (US)

(72) Inventor: Gary L. Fenton, Edgerton, WI (US)

(73) Assignee: STI Holdings, Inc., Stoughton, WI (US)

( * ) Notice: Subject to any disclaimer, the term of this patent is extended or adjusted under 35 U.S.C. 154(b) by 0 days.

(21) Appl. No.: 18/187,351

(22) Filed: Mar. 21, 2023

(65) Prior Publication Data
US 2023/0219320 A1    Jul. 13, 2023

Related U.S. Application Data

(60) Continuation of application No. 17/746,092, filed on May 17, 2022, now Pat. No. 11,633,934, which is a (Continued)

(51) Int. Cl.
*B32B 15/04* (2006.01)
*B32B 3/30* (2006.01)
(Continued)

(52) U.S. Cl.
CPC ............... *B32B 3/30* (2013.01); *B29C 51/08* (2013.01); *B29C 51/10* (2013.01); *B29C 51/12* (2013.01);
(Continued)

(58) Field of Classification Search
CPC .. B62D 29/02; B62D 25/2054; B65D 90/026; B65D 88/121; B32B 7/12; B32B 21/10;
(Continued)

(56) References Cited

U.S. PATENT DOCUMENTS

| 2,934,372 A | 4/1960 | Jewell et al. |
| 3,319,585 A | 5/1967 | Pulcrano |

(Continued)

FOREIGN PATENT DOCUMENTS

EP    0424083 A1    10/1990

OTHER PUBLICATIONS

Whiting airCELL Panels product brochure, publicly available and offered for sale prior to Jun. 4, 2014 (6 pages).

(Continued)

*Primary Examiner* — Pinel E Romain
(74) *Attorney, Agent, or Firm* — Michael Best & Friedrich LLP

(57) ABSTRACT

A composite molded cargo body panel including a core, an interior skin secured to a first side of the core having a thickness, and exterior skin secured to a second side of the core, and a plurality of recesses. The plurality of recesses are dispersed along a first direction at intervals in the interior skin, with the core thickness at each of the plurality of recesses being reduced compared to a maximum core thickness, and each of the plurality of recesses defines a support surface. A pocket is formed in each of the plurality of recesses, with the core thickness at the pocket being less than the core thickness at each of the plurality of recesses. A plurality of logistics inserts are attached to the respective support surfaces of the plurality of recesses so that, at each of the plurality of recesses, the logistics insert extends across the pocket.

20 Claims, 10 Drawing Sheets

Related U.S. Application Data continuation of application No. 17/080,107, filed on Oct. 26, 2020, now Pat. No. 11,338,542, which is a division of application No. 16/458,706, filed on Jul. 1, 2019, now Pat. No. 10,814,581.

(60) Provisional application No. 62/693,743, filed on Jul. 3, 2018.

(51) Int. Cl.
| | |
|---|---|
| *B65D 90/02* | (2019.01) |
| *B29C 51/08* | (2006.01) |
| *B29C 51/10* | (2006.01) |
| *B29C 51/12* | (2006.01) |
| *B29C 51/26* | (2006.01) |
| *B62D 33/04* | (2006.01) |
| *B62D 63/06* | (2006.01) |
| *B29L 31/30* | (2006.01) |

(52) U.S. Cl.
CPC .......... *B29C 51/264* (2013.01); *B29C 51/266* (2013.01); *B32B 15/04* (2013.01); *B62D 33/046* (2013.01); *B65D 90/022* (2013.01); *B29L 2031/3041* (2013.01); *B32B 2439/40* (2013.01); *B62D 63/06* (2013.01)

(58) Field of Classification Search
CPC .............. B32B 5/12; B32B 2307/7265; B32B 2262/101; B32B 2307/546; B32B 2605/00
USPC .......................................... 296/184.1, 193.07
See application file for complete search history.

(56) References Cited

U.S. PATENT DOCUMENTS

| | | | |
|---|---|---|---|
| 3,815,500 A | 6/1974 | Glassmeyer | |
| 3,842,755 A | 10/1974 | Carr | |
| 3,842,756 A | 10/1974 | Marulic | |
| 4,266,897 A | 5/1981 | Jensen | |
| 4,344,995 A | 8/1982 | Hammer | |
| 4,437,699 A | 3/1984 | Lewis et al. | |
| 4,940,279 A | 7/1990 | Abott et al. | |
| 5,066,066 A | 11/1991 | Yurgevich et al. | |
| 5,286,079 A | 2/1994 | Zubko et al. | |
| 5,403,063 A * | 4/1995 | Sjostedt | B62D 33/046 52/630 |
| 5,678,715 A | 10/1997 | Sjostedt et al. | |
| 5,683,525 A | 11/1997 | Kemp et al. | |
| 5,860,693 A | 1/1999 | Ehrlich | |
| 5,934,742 A | 8/1999 | Fenton et al. | |
| 5,988,074 A | 11/1999 | Thoman | |
| 5,997,076 A | 12/1999 | Ehrlich | |
| 6,000,342 A | 12/1999 | Thoman et al. | |
| 6,003,932 A | 12/1999 | Banerjea et al. | |
| 6,010,020 A | 1/2000 | Abal | |
| 6,106,205 A | 8/2000 | Haire | |
| 6,220,651 B1 | 4/2001 | Ehrlich | |
| 6,247,747 B1 | 6/2001 | Kawanomoto et al. | |
| 6,412,854 B2 | 7/2002 | Ehrlich | |
| 6,450,564 B1 | 9/2002 | Sill | |
| 6,527,335 B1 | 3/2003 | Yurgevich | |
| 6,578,902 B2 | 6/2003 | Sill | |
| 6,607,237 B1 | 8/2003 | Graaff et al. | |
| 6,626,622 B2 | 9/2003 | Zubko | |
| 6,742,974 B2 | 6/2004 | Haire | |
| 6,843,525 B2 | 1/2005 | Preisler | |
| 6,893,075 B2 | 5/2005 | Fenton et al. | |
| 6,959,959 B1 | 11/2005 | Roush | |
| 7,014,253 B2 | 3/2006 | Oren | |
| 7,069,702 B2 | 7/2006 | Ehrlich | |
| 7,100,971 B2 | 9/2006 | Pines | |
| 7,152,912 B1 | 12/2006 | Roush et al. | |
| 7,350,853 B2 | 4/2008 | Fitze | |
| 7,422,270 B2 | 9/2008 | Graaff et al. | |
| 7,461,888 B2 | 12/2008 | Brown | |
| 7,500,713 B2 | 3/2009 | Riley et al. | |
| 7,527,325 B2 | 5/2009 | Yurgevich | |
| 7,540,085 B2 | 6/2009 | Fenton et al. | |
| 7,588,286 B2 | 9/2009 | Lewallen et al. | |
| 7,621,589 B1 | 11/2009 | Gerome | |
| 7,704,026 B2 | 4/2010 | Roush et al. | |
| 7,762,618 B2 | 7/2010 | Lewallen | |
| 7,765,758 B2 | 8/2010 | Chorney et al. | |
| 7,798,753 B2 | 9/2010 | Yurgevich | |
| 7,862,103 B2 | 1/2011 | Riley et al. | |
| 7,931,328 B2 | 4/2011 | Lewallen et al. | |
| 8,006,386 B2 | 8/2011 | Ehrlich | |
| 8,016,152 B2 | 9/2011 | Roush et al. | |
| 8,056,960 B2 | 11/2011 | Brown | |
| 8,186,747 B2 | 5/2012 | Bloodworth et al. | |
| 8,419,110 B2 | 4/2013 | Katz et al. | |
| 8,424,958 B2 | 4/2013 | Wylezinski et al. | |
| 8,506,221 B2 | 8/2013 | Pattison et al. | |
| 8,540,099 B2 | 9/2013 | Roush | |
| 8,652,382 B2 | 2/2014 | Eggert et al. | |
| 8,714,633 B2 | 5/2014 | Wary | |
| 8,720,974 B2 | 5/2014 | Hurst et al. | |
| 8,927,085 B2 | 1/2015 | Burton | |
| 8,998,295 B2 | 4/2015 | Katz et al. | |
| 9,242,591 B2 | 1/2016 | Ehrlich | |
| 9,314,875 B2 | 4/2016 | Stephan | |
| 9,394,010 B2 | 7/2016 | Kunkel | |
| 9,738,050 B2 | 8/2017 | Lee et al. | |
| 9,884,660 B2 | 2/2018 | Fenton | |
| 9,884,661 B2 | 2/2018 | Fenton | |
| 9,944,334 B1 | 4/2018 | Kaufmann | |
| 10,118,653 B2 | 11/2018 | Fenton | |
| 10,266,098 B1 | 4/2019 | Cox et al. | |
| 10,564,018 B2 | 2/2020 | Fenton | |
| 10,584,992 B2 | 3/2020 | Fenton | |
| 10,814,581 B2 * | 10/2020 | Fenton | B32B 27/065 |
| 11,021,006 B2 | 6/2021 | Streichardt | |
| 11,136,072 B2 | 10/2021 | Fenton | |
| 2003/0080586 A1 | 5/2003 | Ehrlich | |
| 2003/0184120 A1 | 10/2003 | Buchholz et al. | |
| 2005/0241253 A1 | 11/2005 | Song et al. | |
| 2007/0284913 A1 | 12/2007 | Ehrlich | |
| 2008/0134509 A1 | 6/2008 | Lewallen et al. | |
| 2008/0292898 A1 | 11/2008 | Straza | |
| 2009/0053548 A1 | 2/2009 | Straza | |
| 2012/0169087 A1 | 7/2012 | Griffin et al. | |
| 2013/0224419 A1 | 8/2013 | Lee et al. | |
| 2013/0330521 A1 | 12/2013 | Ebnoether | |
| 2015/0044494 A1 | 2/2015 | Ebnoether | |
| 2015/0279345 A1 | 10/2015 | Mathur | |
| 2015/0353138 A1 | 12/2015 | Fenton | |
| 2016/0001721 A1 | 1/2016 | Owens et al. | |
| 2016/0152281 A1 | 1/2016 | Hansen | |
| 2016/0201336 A1 | 10/2016 | Pervan | |
| 2017/0036415 A1 | 2/2017 | Ebnoether et al. | |
| 2017/0057561 A1 | 3/2017 | Fenton | |
| 2017/0057562 A1 | 3/2017 | Fenton | |
| 2018/0015956 A1 | 1/2018 | Jaworski et al. | |
| 2018/0050523 A1 | 2/2018 | Pilpel et al. | |
| 2018/0057077 A1 | 3/2018 | Ehrlich | |
| 2018/0297339 A1 | 10/2018 | Fergusson et al. | |
| 2019/0039344 A1 | 2/2019 | Ebnoether | |
| 2019/0071135 A1 | 3/2019 | Fenton | |
| 2019/0077126 A1 | 3/2019 | Short | |
| 2019/0078920 A1 | 3/2019 | Fenton | |
| 2020/0009824 A1 | 1/2020 | Fenton | |
| 2021/0140806 A1 | 5/2021 | Fenton | |
| 2022/0017157 A1 | 1/2022 | Fenton | |

OTHER PUBLICATIONS

TruckingInfo.com, "Trailer Update," downloaded from http://www.truckinginfo.com/article/story/2013/07/trailer-update.aspx, available Jul. 2013, (10 pages).

(56) References Cited

OTHER PUBLICATIONS

Trailer-bodybuilders.com, "Mid-America Trucking Show coverage: Newest trailer designs exhibited at MATS," : lownloaded from http://trailer-bodybuilders.com/trailers/mid-america-trucking-show-coverage-newest-trailer-, May 1, J013 (5 pages).
Transport Topics, Whiting Door Licenses Technology to Make Lightweight Steel Panels, downloaded from http://www.ttnews.com/articles/printopt.aspx?storyid=34581, Mar. 31, 2014 (2 pages).

* cited by examiner

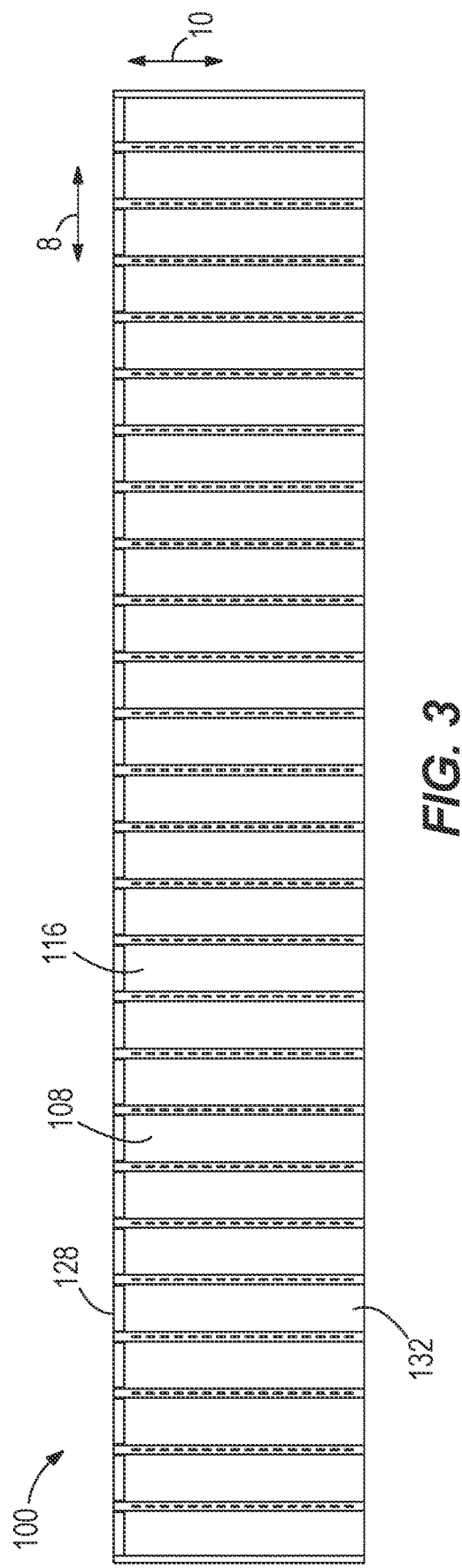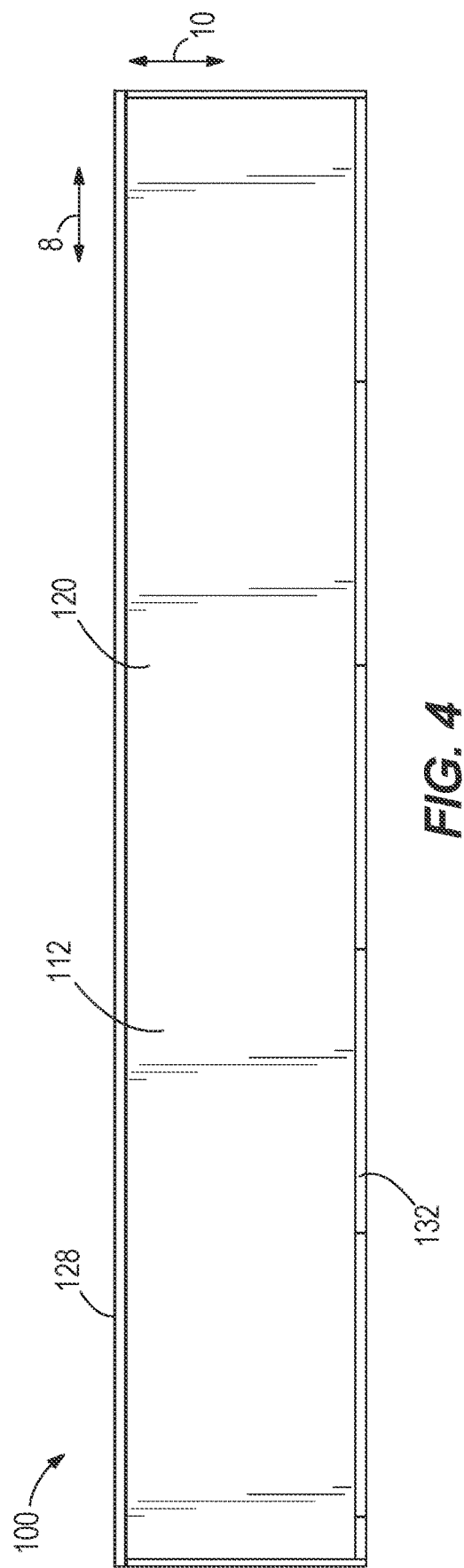

METHOD OF MANUFACTURING A CARGO BODY PANEL

CROSS-REFERENCE TO RELATED APPLICATIONS

The present patent application is a continuation of co-pending U.S. patent application Ser. No. 17/746,092, filed May 17, 2022, which is a continuation of U.S. patent application Ser. No. 17/080,107, filed Oct. 26, 2020, now U.S. Pat. No. 11,338,542, which is a continuation of U.S. patent application Ser. No. 16/458,706, filed Jul. 1, 2019, now U.S. Pat. No 10,814,581, which claims priority to U.S. Provisional Patent Application No. 62/693,743 filed on Jul. 3, 2018, the entire contents of both of which is hereby incorporated by reference.

BACKGROUND

The invention relates to cargo body construction, for example, for over-the-road trailers pulled by semi tractors. In particular, the invention relates to trailer sidewall construction. Trailer sidewalls are often constructed from a number of panels joined together at joints (e.g., vertical post joints, lap joints, or splice plates).

SUMMARY

According to one aspect of the invention, a composite molded cargo body panel has an overall flat rectangular shape that spans a first direction and a second direction perpendicular to the first direction. The composite molded cargo body panel includes a core, an interior skin secured to a first side of the core, an exterior skin secured to a second side of the core opposite the first side, a plurality of recesses dispersed along the first directions at intervals in the interior skin, a pocket formed in each of the plurality of recesses, and a plurality of logistics profile inserts. The core has a thickness measured perpendicular to the first and second directions. The interior skin defines an interior surface of the composite molded cargo body panel for facing a cargo receiving volume of a cargo body constructed with the composite molded cargo body panel. The exterior is spaced from the interior skin such that a spacing distance between the interior and exterior skins defines the core thickness. The core thickness at each of the plurality of recesses is reduced compared to a maximum core thickness, with each of the plurality of recesses defining a support surface. The core thickness at the pocket is less than the core thickness at each of the plurality of recesses. The plurality of logistics inserts are attached to the respective support surfaces of the plurality of recesses so that, at each of the plurality of recesses, the logistics profile insert extends across the pocket. The exterior skin is continuous, spanning the plurality of recesses in the first direction.

According to another aspect of the invention, a composite molded cargo body panel has an overall flat rectangular shape that spans a first direction and a second direction perpendicular to the first direction. The composite molded cargo body panel includes a core, an interior skin secured to a first side of the core, an exterior skin secured to a second side of the core opposite the first side, a plurality of recesses dispersed along the first directions at intervals in the interior skin, and a pocket formed in each of the plurality of recesses. The core has a thickness measured perpendicular to the first and second directions. The interior skin defines an interior surface of the composite molded cargo body panel for facing a cargo receiving volume of a cargo body constructed with the composite molded cargo body panel. The exterior is spaced from the interior skin such that a spacing distance between the interior and exterior skins defines the core thickness. The core thickness at each of the plurality of recesses is reduced compared to a maximum core thickness. The core thickness at the pocket is zero.

According to yet another aspect of the invention, a composite molded cargo body panel has an overall flat rectangular shape that spans a first direction and a second direction perpendicular to the first direction. The composite molded cargo body panel includes a core, an interior skin secured to a first side of the core, an exterior skin secured to a second side of the core opposite the first side, and a plurality of recesses dispersed along the first directions at intervals in the interior skin. The core has a thickness measured perpendicular to the first and second directions. The interior skin defines an interior surface of the composite molded cargo body panel for facing a cargo receiving volume of a cargo body constructed with the composite molded cargo body panel. The exterior is spaced from the interior skin such that a spacing distance between the interior and exterior skins defines the core thickness. The exterior skin is continuous throughout the entirety of the composite molded panel. A plurality of pockets are dispersed along the first direction at intervals in the interior skin, and the core thickness at each of the plurality of pockets is reduced to zero. The interior skin is absent at each of the plurality of pockets.

BRIEF DESCRIPTION OF THE DRAWINGS

FIG. 3 is an inner side view of a composite sidewall panel for a cargo body according to a construction of the present invention.

FIG. 4 is an outer side view of the composite sidewall panel of FIG. 3.

DETAILED DESCRIPTION

Figure 1:
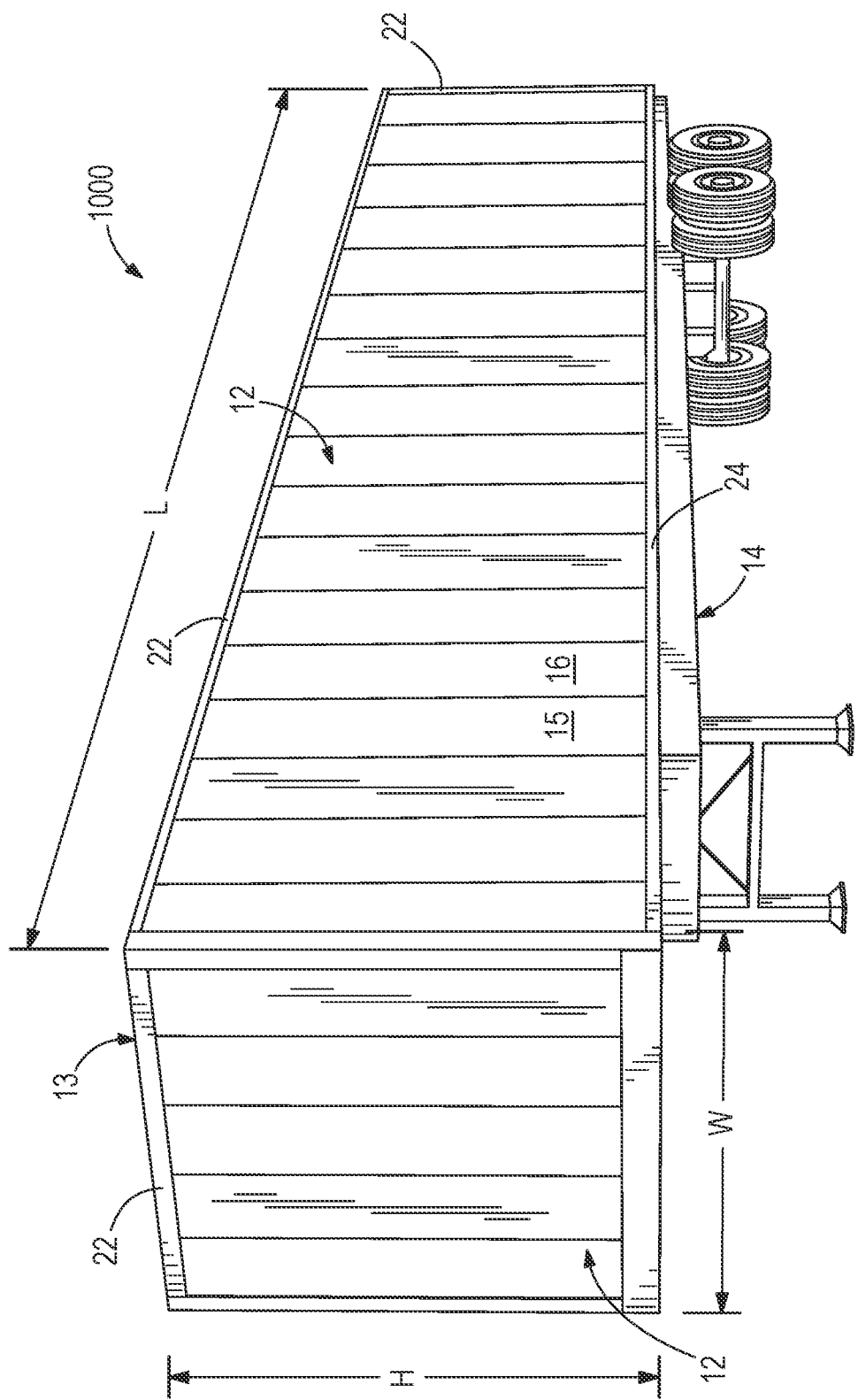
FIG. 1 is a perspective view of a trailer, including a plurality of sidewalls having sidewall joints.
Figure 2:
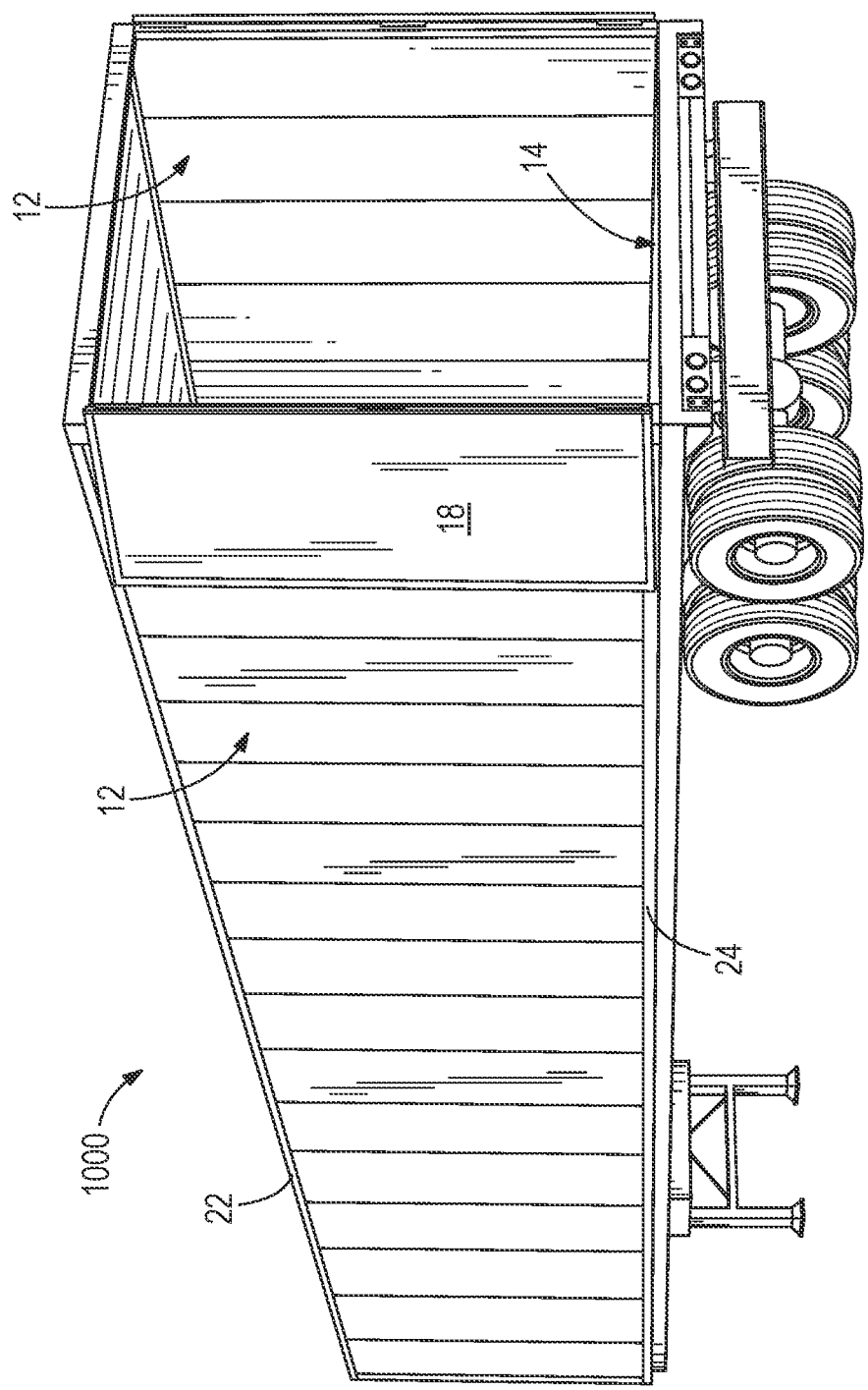
FIG. 2 is an alternate perspective view of the trailer of FIG. 1.

FIGS. 1 and 2 illustrate a trailer 1000 as disclosed in U.S. Pat. No. 9,884,660 for over-the-road use with a truck to transport large cargo volumes. As shown, the trailer 1000 is a semi-trailer configured for use with a road tractor (i.e., in forming a so-called 18-wheeler). The trailer 1000 includes a chassis having axles with multiple sets of wheels. The trailer 1000 defines a length L in a longitudinal or transport direction, defining a first direction 8, and the length L may be 53 feet. Perpendicular to the longitudinal direction, the trailer 1000 defines a width W, defining a second direction 9, and a height H, defining a third direction 10. The width W cooperates with the length L to define a plan view footprint of the trailer 1000, while the height H is measured perpendicular to the footprint (i.e., perpendicular to the ground). Subtracting for wall thicknesses, the length L, the width W, and the height H cooperate to define a cargo receiving interior volume of the trailer 1000. The trailer 1000 includes a plurality of sidewalls 12, including two primary lengthwise sidewalls 12 and a sidewall 12 facing the leading direction and spanning between the two primary lengthwise sidewalls 12. All of the sidewalls 12 extend between a roof 13 of the trailer 1000 and a floor 14 of the trailer 1000. As discussed in further detail below, the sidewalls 12 can be constructed of pairs of panels 15, 16 joined together by joints extending parallel to the direction of the trailer height H between the roof 13 and the floor 14. Top rails 22 and bottom rails 24 are provided to flank and secure the upper and lower edges of each of the sidewall panels 15, 16. At the rear of the trailer 1000 as shown in FIG. 2, at least one door panel 18 is provided to selectively open for accessing the interior cargo volume for loading and unloading.

FIGS. 3-8 illustrate a composite sidewall 100 for a cargo body. For example, the sidewall 100 may be used in constructing an over-the-road semi-trailer like that of FIGS. 1 and 2. In particular, the construction of the sidewall 100 may be applied to the two longitudinal sidewalls that span the length of the trailer in the travel direction. More particularly, FIGS. 3-8 disclose a curbside sidewall for such a semi-trailer. However, it will be understood that an opposite sidewall of the semi-trailer, though not shown, can be constructed of similar components according to similar methods, and the opposite sidewall may be, for example, a mirror image of the illustrated curbside sidewall. Aspects of the invention are not necessarily limited to semi-trailers like that of FIGS. 1 and 2, and other trailer and cargo body configurations are understood as optional.

The sidewall 100 is manufactured (e.g., molded) as a single panel to span the length of the cargo body. The sidewall 100 has a composite construction including a core sheet, or simply, core 104, and respective interior and exterior skins 108, 112. The interior skin 108 is secured to a first side 116 of the core 104 facing the cargo receiving volume of the trailer, and the exterior skin 112 is secured to a second side 120 of the core 104 opposite the first side 116 and facing the exterior of the trailer. The skins 108, 112 conform to the core 104, including certain irregularities or offsets as described below. Each of the interior and exterior skins 108, 112 can have a thickness perpendicular to a sheet plane that is not less than 0.008 inch and not more than 0.100 inch in some constructions (e.g., 0.050 inch). The interior and exterior skins 108, 112 can be steel, aluminum, or composite material (e.g., reinforced plastic such as fiberglass-reinforced plastic, or plastic reinforced with carbon fiber or other structural strand and/or fabric). In some constructions, the length of the single-panel sidewall is 624 inches or 52 feet. One or both of the skins 108, 112 can be continuous, as a single piece, to span the entire panel length.

Figure 5:
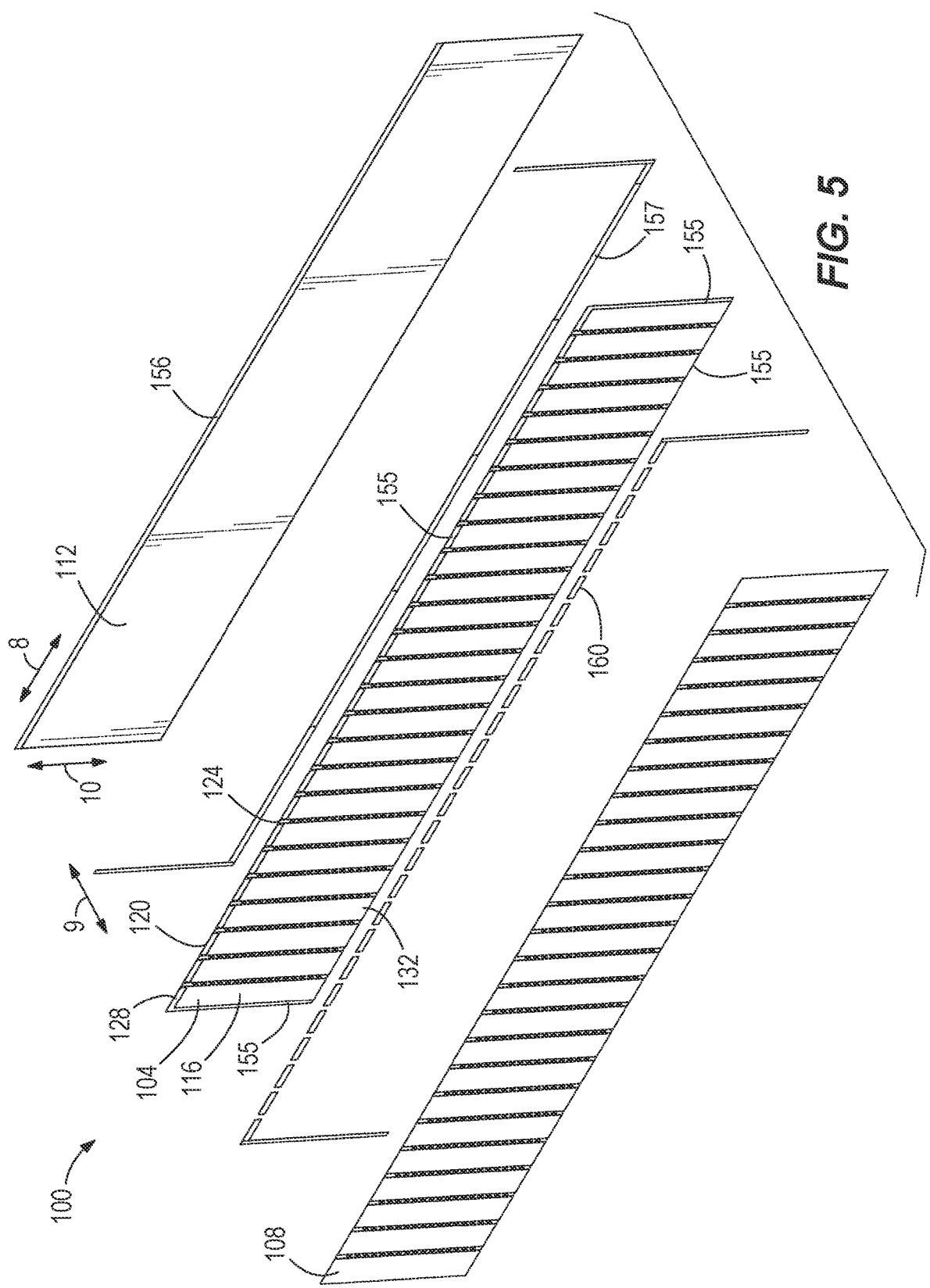
FIG. 5 is an exploded assembly view of the composite sidewall panel of FIG. 3.
Figure 6:
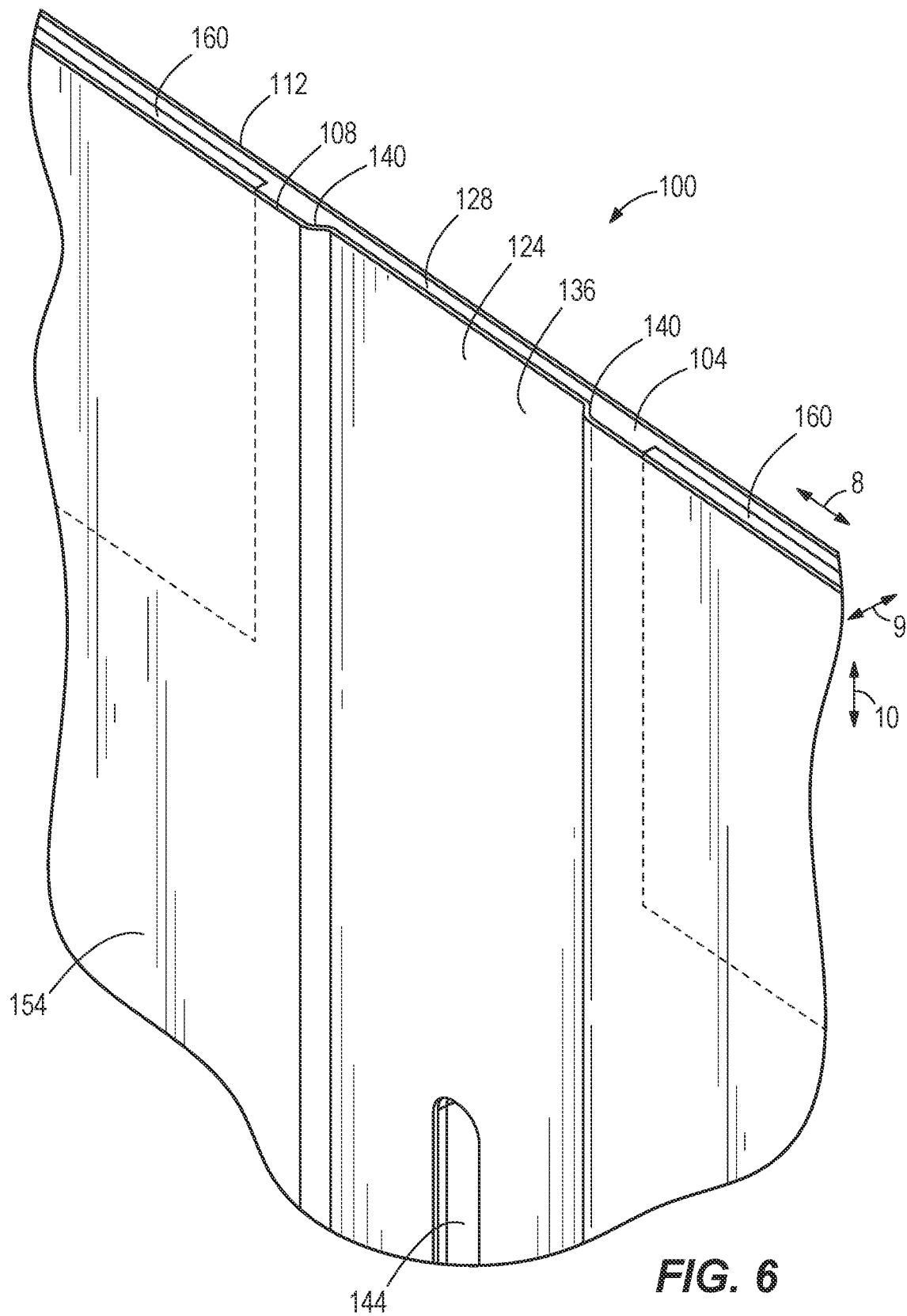
FIG. 6 is an enlarged perspective view of the composite sidewall panel of FIG. 5 having a recess, prior to attachment of logistics inserts.
Figure 7:
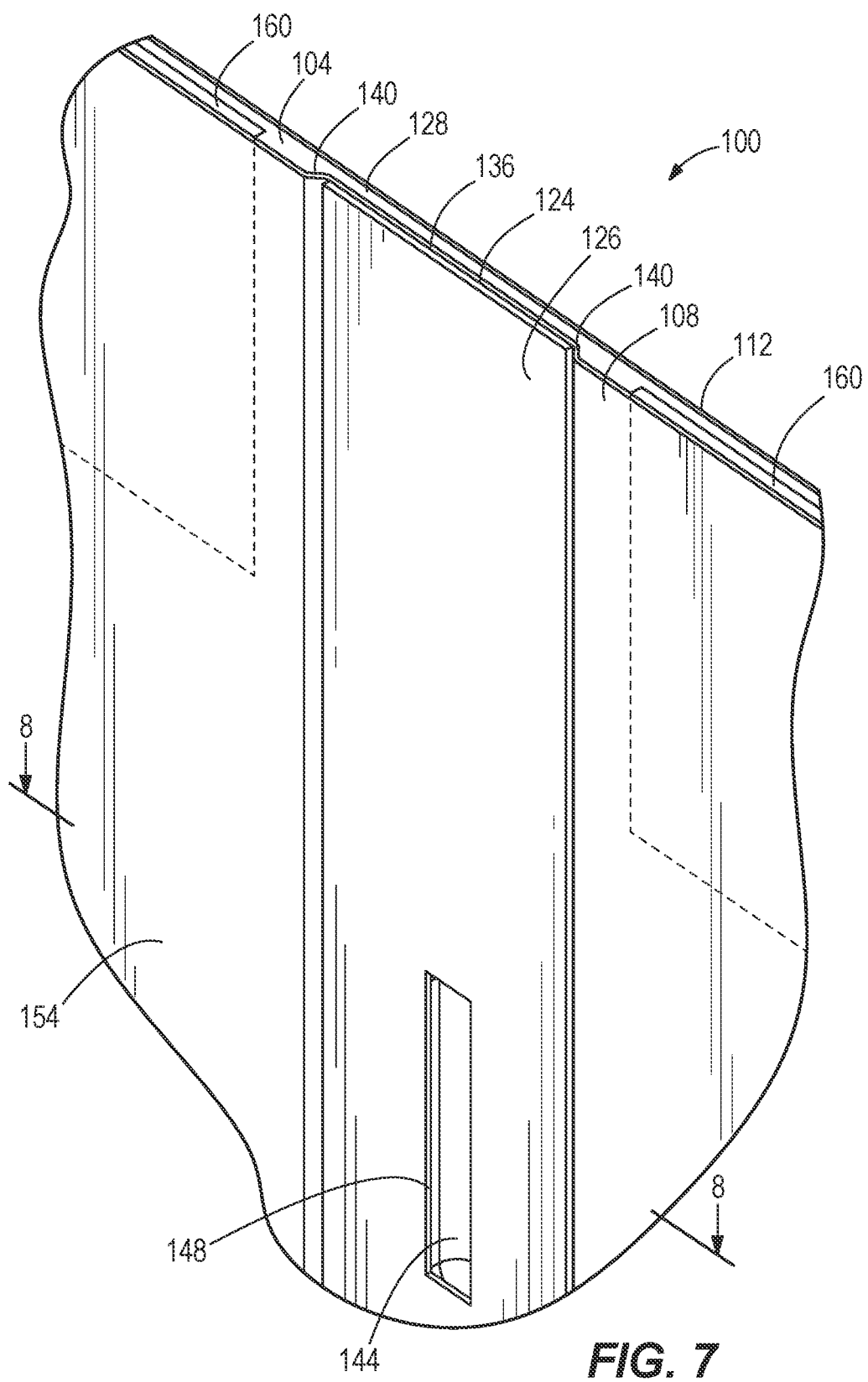
FIG. 7 is a perspective view of the composite sidewall panel of FIG. 5 after attachment of logistics inserts.

FIGS. 5-8 illustrate that the interior surface of the sidewall 100 can include a plurality of recesses 124 at regular intervals along the first direction 8 (e.g., 24 inches or 2 feet on-center spacing) to accommodate a plurality of logistics inserts 126 (see FIG. 7). The recesses 124 can be elongated in the sidewall height direction and may extend fully from a top edge 128 to a bottom edge 132, although the recesses 124 may alternately extend over less than the entire height. With reference to FIG. 6, the recesses 124 can each include a bottom face 136 and two transition faces 140 positioned on alternate sides of the bottom face 136. The transition faces 140 connect the bottom face 136 to the remainder of the interior surface of the sidewall 100, the bottom face 136 being offset relative to the remainder of the interior surface. Each of the transition faces 140 can extend at an angle relative to the bottom face 136 that is greater than 90 degrees. Alternatively, the angle between the transition face 140 and the bottom face 136 may be equal to or less than 90 degrees. The logistics insert 126 is positioned against the bottom face 136 of the recess 124 as shown in FIG. 7, such that the bottom face 136 acts as a supporting surface for the logistics insert 126. The logistics insert 126 may be in direct or indirect contact with the bottom face 136.

Spaced along each recess 124 in the third direction 10 are a plurality of sub-recesses or pockets 144. The pockets 144 can be positioned along a center, or middle, of each of the bottom faces of the recesses 124, as measured along the first direction 8 of the sidewall 100, at regular lengthwise intervals along third direction 10 (e.g., 6 inches on-center spacing). Alternatively, the pockets 144 may be positioned at an alternate position on the bottom face 136 of the recess 124 and may be provided in more than one row. The pockets 144 can provide clearance for fittings and hardware attached to the logistics insert 126 during use of the assembled cargo body. In the illustrated construction, the pockets 144 do not support the logistics insert 126. In other words, the logistics insert 126 does not extend into the pocket(s) 144. Alternatively, a portion of the logistics insert 126 may extend into the pocket(s) 144 so that the pockets 144 provide support for the logistics insert 126.

In some embodiments, the pockets 144 can be oval in shape. In other embodiments, the pockets 144 may be square in shape, rectangular in shape, or the like. The pockets 144 can be formed by through holes in the interior skin 108 and corresponding pockets recessed into the core 104, such that a hole is formed in the interior skin 108 at each of the pockets 144. Alternately, the interior skin 108 may be recessed into one or more of the core pockets, rather than being punched or otherwise apertured, such that the interior skin 108 is continuous through the pocket(s) 144 and forms an interior-facing surface thereof.

With renewed reference to FIG. 7, the logistics insert 126 is a flat plate having a length that extends along the third direction 10 of the recess 124. The logistics insert 126 includes a plurality of apertures 148 spaced along the length of the logistics insert 126 such that the apertures 148 are positioned over the pockets 144 when the logistics insert 126 is positioned in the recess 124 (e.g., edges of the logistics insert apertures 148 match up with edges of the core 104 formed by the pocket 144). The logistics insert 126 can have a thickness that is the same as the offset amount between the bottom face 136 and the remainder of the interior surface such that an interior surface of the logistics insert 126 is planar with the remainder of the interior surface of the panel. Alternatively, the thickness of the logistics insert 126 may be less than or greater than the offset amount between the bottom face 136 and the remainder of the interior surface of the panel. Although FIG. 7 illustrates that the logistics inserts 124 can be secured exclusively by bonding into the respective recesses 116, alternatively or additionally the logistics inserts 126 can be secured with fasteners, such as screws or rivets (e.g., arranged in rows).

Figure 8:
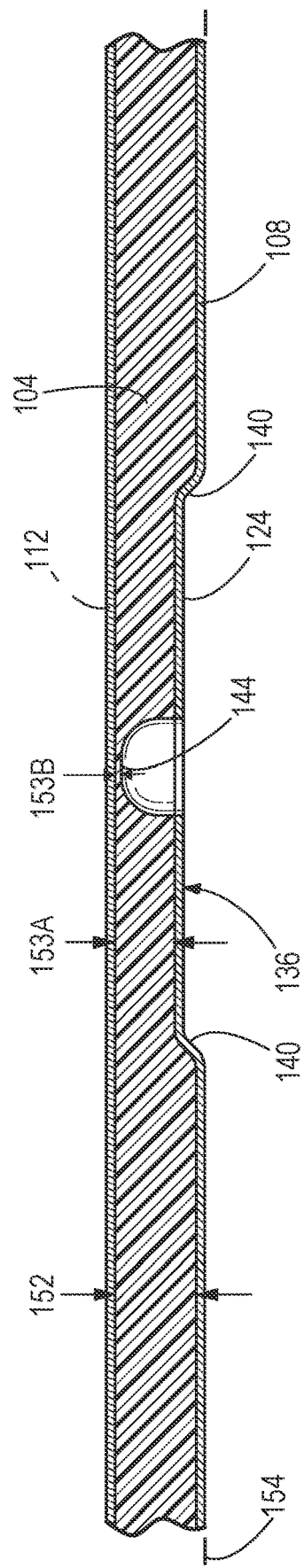
FIG. 8 is a cross sectional view of the composite sidewall panel of FIG. 5, along line 8-8, as shown in FIG. 7.

Referring to FIG. 8, the core 104 can define a thickness (e.g., maximum thickness 152) that is present throughout some but not all portions of the sidewall 100. Core thickness at any location is measured between the interior and exterior core surfaces that receive the interior and exterior skins 108, 112. In other words, core thickness is measured in the second direction 9 perpendicular to the principal parallel planar directions, or the first direction 8 and the third direction 10, of the interior and exterior skins 108, 112. At locations in which the interior and/or the exterior skins 108, 112 are removed from the core 104, core thickness is measured between the first side 116 of the core 104 and the second side 120 of the core 8. In some constructions, the core thickness throughout a majority of the sidewall 100 defines a maximum thickness 152 of the core 104. However, the description below refers to designated thickness-reduced portions of the core 104 (i.e., reduced core thickness 153A at the recesses 124, and reduced core thickness 153B at the pockets 144). In some constructions, the maximum core thickness 152 can be 0.200 inch or greater, more particularly 0.400 inch or greater, up to 1.5 inches, or more. For example, the maximum core thickness 152 can be about ½ inch (i.e., 0.500 inch +/−⅛ inch). The maximum core thickness 152 can be 0.625 inch. The recesses 124 can be recessed or offset about 0.125 inch or less (e.g., 0.080 inch) from a plane 154 defined by the unrecessed parts of the interior skin 108. All the recesses 124 can be recessed the same in depth, or the depths of individual recesses 124 may differ. The pockets 144 can be recessed or offset about 0.437 inch from the plane 154. This may leave a core thickness of less than 0.100 inch at the pocket locations (e.g., 0.087 inch). In other constructions, the core thickness is reduced to zero at the pocket locations, representing discontinuities or apertures in the core 104.

The core 104 can be constructed of any one or more of a number of materials including, but not limited to, metal (e.g., carbon steel, mild steel, stainless steel, galvanized steel, or aluminum), wood, plastic (e.g., extruded polyethylene (PE), foam such as polymer foam (e.g., plastic, PE-based foam, blow molded, thermoset, etc.), paper, ceramic. The core structure can be flat or plate-like, formed as a honeycomb structure, or a profiled sheet with interspersed peaks and valleys. As such, the core 104 may have a consistent material cross-section with uniform density, either solid or including void spaces, or alternately a variable cross-section construction. The core 104 can span the entire sidewall length (and height), although the thickness of the core 104 may vary throughout as discussed further herein.

In addition to the portions of the core 104 that are thickness-reduced at the recesses 124 (and further at the pockets 144), additional thickness reductions 155 may be present as shown throughout FIG. 5. The thickness reductions 155 can include a full lengthwise reduction, creating an offset or recess on the exterior side for receiving an upper or top rail 156 of the cargo body. The core thickness at the thickness reductions 155 can be reduced to about 0.125 inch. The exterior skin 112 conforms to the core 104 so as to follow the offset of the core 8 created by the thickness reduction 155 for the top rail 156. In an alternate construction, there may be an offset or recess formed for the top rail on the interior side of the core 104, rather than the exterior side. Thickness reductions 155 in the core 104 can also be provided at one of the lengthwise ends and along a lengthwise-extending bottom edge 132 to accommodate outer assembly plating 157 as shown in FIG. 5. Likewise, core thickness reductions along an opposite one of the lengthwise ends and along a lengthwise-extending top edge 128 are provided to accommodate inner assembly plating 160, also shown in FIG. 5. Plates can be provided in quantities exceeding one (e.g., twenty-five of the assembly plates, and five of the assembly plates). In constructions where the cargo body upper and lower rails are secured to the panel of the sidewall 100 with fasteners that extend through the core 104 and/or skins 108, 112, the assembly plating 157, 160 provides enhanced fastener retention. Any or all of the thickness reductions 155 in the core 104 can be manufactured by machining (e.g., CNC) to remove core material. In some cases, the core 104 may begin production as a sheet of uniform thickness. The core 104 can be processed by routing, milling, etc. into the configuration of FIGS. 3 and 4.

The manufacturing process for constructing the sidewall 100 can include separately manufacturing the plates 157, 160, the core 104, the interior skin 108, and the exterior skin 112, although it is noted that these components may optionally be provided in a pre-production shape, which is not their final shape, when brought together for assembly. The exterior skin 112 is first laid down on its exterior side on a table or platen. The plates 157 of the outer assembly plating are then placed onto the interior side of the exterior skin 108. The core 104 is then laid onto the exterior skin 112 and the plates 157, with the plates 157 being received into core recesses so that the exterior surface of the core 104 lies against the interior side of the exterior skin 112. The plates 160 of the inner assembly plating are then placed onto the core 104, and in particular placed into core recesses on the interior side of the core 104. Thus, the plates 157, 160 can be flush with the interior side of the core 104 for receiving the interior skin 108, which is then laid onto the interior side of the core 104. As noted above, this can include laying one continuous interior skin 108 across the entire core 104, from end to end and side to side, including the recesses 124. Alternately, this step can include laying multiple, independent sections of the interior skin 108. Once all the components are assembled together as stated above, the panel 100 can be molded (e.g., vacuum molded) into a single piece. The molding may include shaping of the skin(s) 108, 112 to conform to the core 104 in addition to bonding with the core 104. In some cases the core 104 may also be subjected to shaping during the molding. In some aspects (e.g., where the skins 108, 112 are metal), molding may refer to stamping of the panel components (e.g., from a flat starting configuration to a non-flat final configuration). Although it is possible in some constructions to also include the logistics inserts 126 in the assembly of the panel prior to molding, the logistics inserts 126 may be placed into the recesses 124 and attached after molding of the panel 100 is completed. Alternatively, the logistics insert 126 may be used to mold, press, or otherwise shape the recesses 124 into the panel. For example, the core 104, the interior skin 108, and the exterior skin 112 may be assembled prior to heating the core 104. Once the core 104 is heated, the logistics inserts 126 may be pressed into the core 104, forming the recesses 124 and the pockets 144 in the core 104 and the interior skin 108. Additionally, the interior skin 108 and the exterior skin 112 may be assembled onto the core 104 at the same time in which the core 104 is pressed to form the recesses 124. The logistics inserts 126 can be attached with or without mechanical fasteners (e.g., screws, rivets). For example, the logistics inserts 126 can be bonded into the recesses 124 (e.g., with adhesive). If bonded in place, the logistics inserts 124 may optionally also be attached with mechanical fasteners. Once the sidewall 100 is completely assembled, it is joined with additional walls, a floor, and a roof to construct a cargo body or cargo box, e.g., a trailer having the general shape and features of the trailer 1000 of FIGS. 1 and 2. Additional components of the cargo body, such as the upper and lower rails of each sidewall 100 can be assembled at the time of final cargo body construction or alternately assembled with their respective sidewalls 100 prior to final cargo body construction. Similar to the attachment of the logistics inserts 126, the upper and lower rails can be bonded and/or attached with mechanical fasteners.

The core thickness 153B at the pocket 144 is significantly reduced when compared with the core thickness of the recess 124. In the illustrated embodiment, the core thickness 153A at the recess 124 is less than 85% of the maximum core thickness 152, whereas the core thickness 153B at the pocket 144 is less than 15% of the maximum core thickness 152. In other embodiments, the core thickness 153B at the pocket 144 may be absent, or greater than 15% of the maximum core thickness 152. The pocket 144 defines a surface that is oval in shape. In other words, the cross sectional view of the pocket 144 depicts a half oval, such that the pocket 144 does not include any edges, but rather a curved profile. In other embodiments, the pocket 144 may include a cross sectional shape that is different than an oval.

Figure 9:
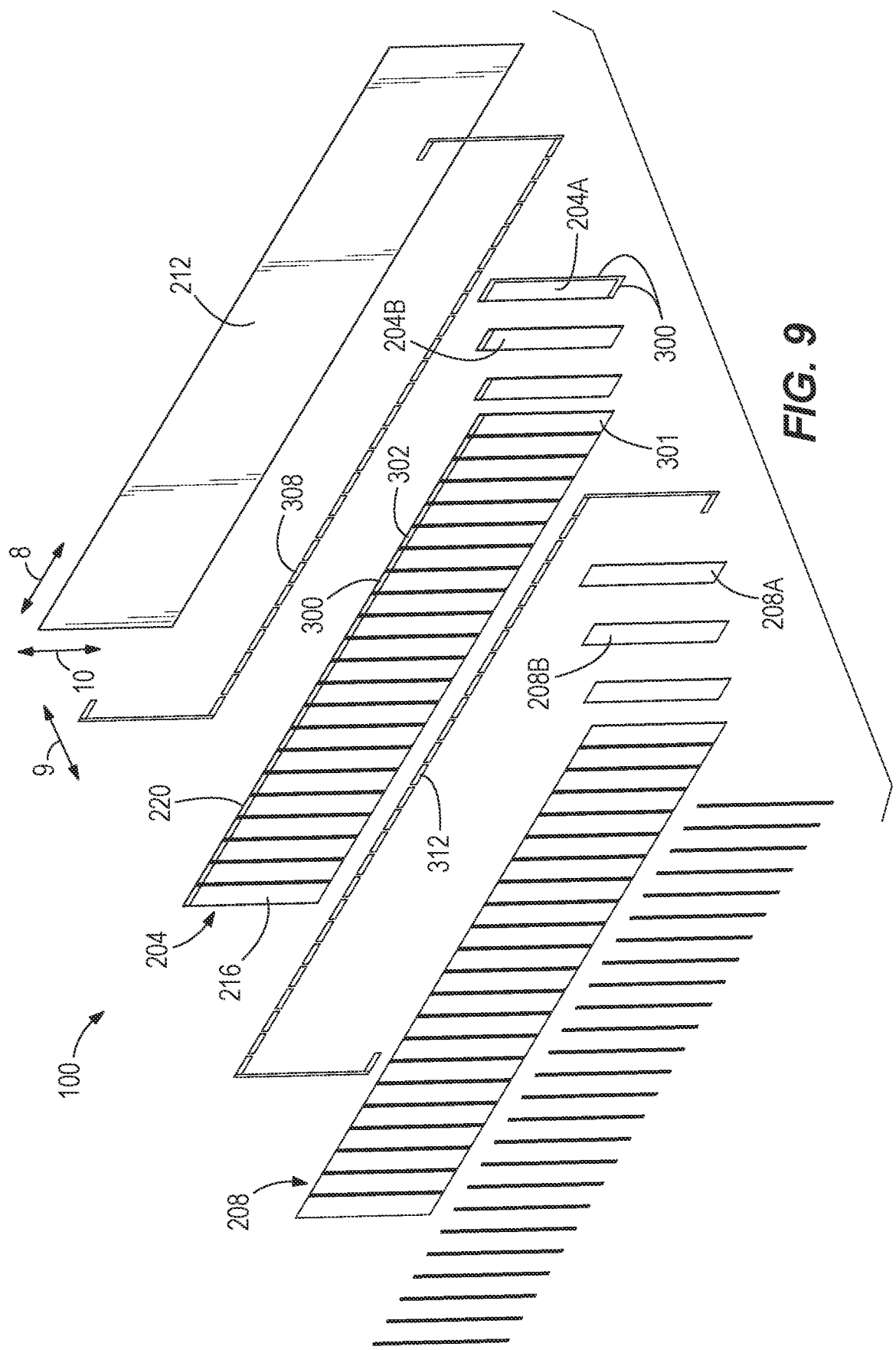
FIG. 9 is an exploded assembly view of a composite sidewall panel according to an alternate embodiment of the invention.
Figure 10:
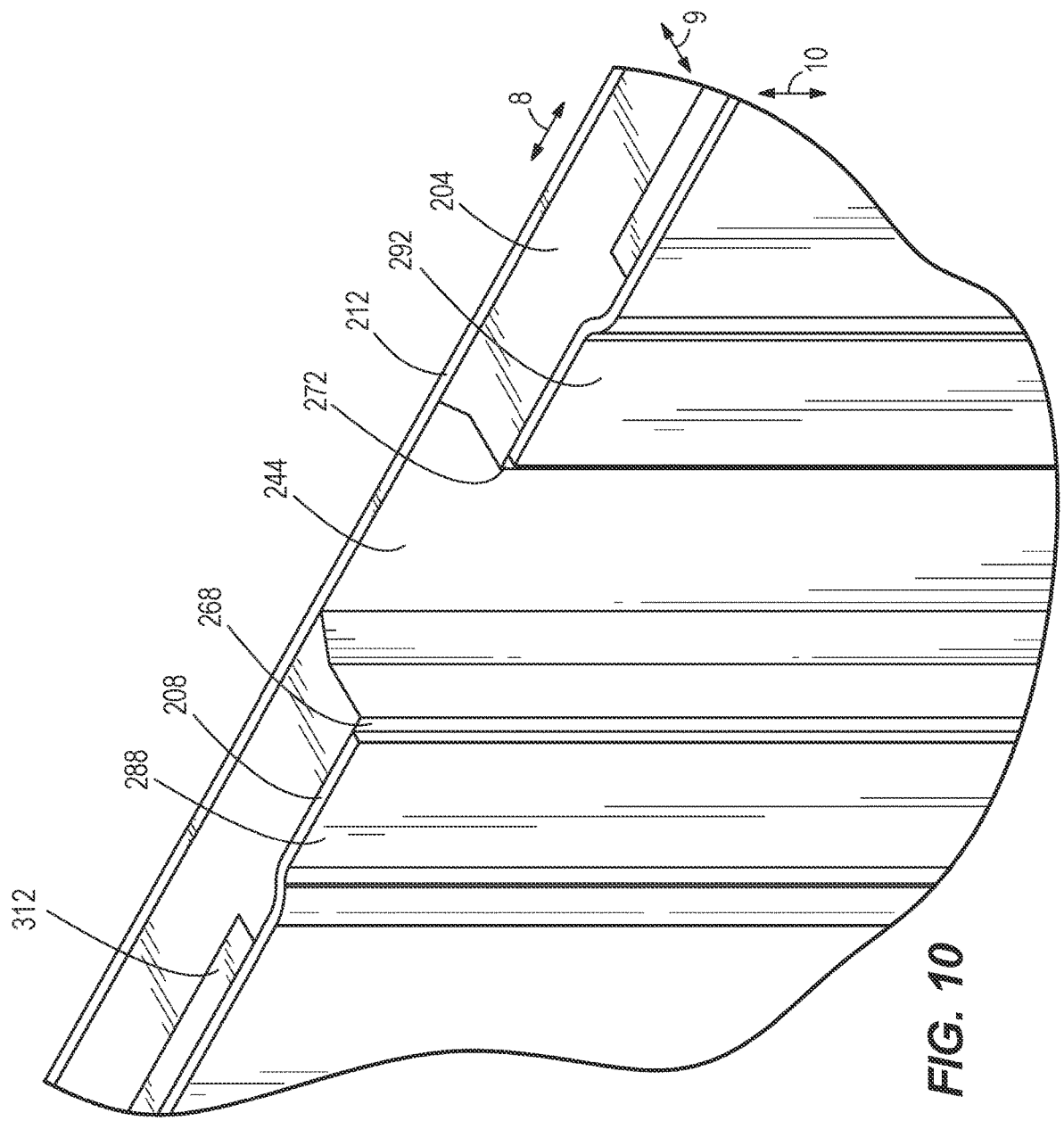
FIG. 10 is an enlarged perspective view of the composite sidewall panel of FIG. 10 having a recess, prior to attachment of logistics inserts.
Figure 11:
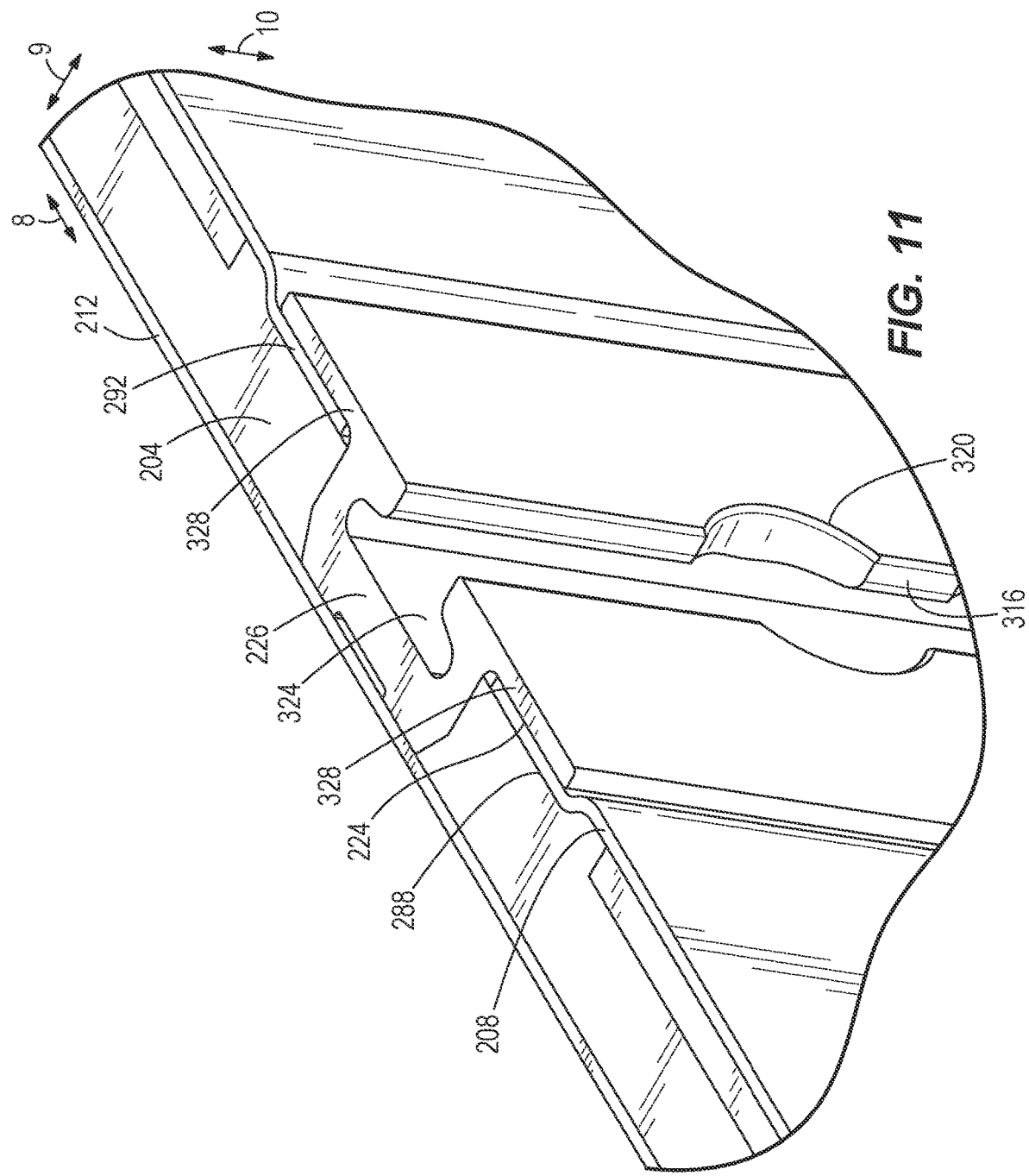
FIG. 11 is a perspective view of the composite sidewall panel of FIG. 10 after attachment of logistics inserts.

FIGS. 9-11 illustrate an alternate sidewall 200 according to another embodiment of the invention. The sidewall 200 includes a core 204 with an interior skin 208 secured to a first side 216 of the core 204 and an exterior skin 212 secured to a second side 220 of the core 204. As shown in FIG. 9, recesses 224 similar to the recesses 124 of FIG. 3 are formed in the sidewall 200. The recesses 224 of FIG. 9 differ from the recesses 124 of FIG. 3 in that pockets 244 disposed in the recesses 224 have a core thickness of zero and extend along the entirety of each recess 224. In other words, the pockets 244 form gaps in the core 204 such that the core 204 includes separate core segments 204A, 204B separated by the pockets 244. Intermediate core segments 204A and those core segments 204A that are disposed between two pockets 244, and can include a recessed first edge 268 and a recessed second edge 272, the recessed first edge 268 being on an opposing side to the recessed second edge 272 along direction 8. When the core segment 204A is assembled within the sidewall 200, the recessed first and second edge 268, 272 of adjacent core segments are disposed on opposite sides of a mutually defined pocket 244. End core segments 204B can differ from the intermediate core segments 204A in that the end core segments 204B may include solely one recessed edge. Alternatively, the end core segments 204B may be identical to the intermediate core segments. In addition, the end core segments 204B may include additional recessions to accommodate assembly plating.

Similar to the core 204, the interior skin 208 does not extend into the pocket 244, meaning the interior skin 208 also includes gaps, forming separate interior skin segments 208A, 208B. The interior skin segments 208A, 208B conform to the core 204, such that intermediate interior skin segments 208A also include a recessed first edge 288 and a recessed second edge 292. End interior skin segments 208B may include solely one recessed edge, although the end interior skin segments 208B may be identical to the intermediate interior skin segments 208A. In some embodiments, the interior skin segment 208A, 208B may be shorter than the core segment 204A, 204B, such that the interior skin segment 208A, 208B ends prior to the core segment 204A, 204B ending. Alternatively, the interior skin segment 280 and the core segment 260 may be the same length.

Thickness reductions 300 in the core segments 204A, 204B can also be provided at one of the lengthwise ends and along a lengthwise-extending bottom edge 301 to accommodate outer assembly plating, as shown in FIGS. 9 and 10. Likewise, core thickness reductions 300 along an opposite one of the lengthwise ends and along a lengthwise-extending top edge 302 are provided to accommodate inner assembly plating 308, 312, also shown in FIG. 9. Plates may be provided in quantities similar to the quantity of interior skin segments 280. In other words, a bottom plate 308 and a top plate 312 may be provided for each core segment 260. In additional embodiments, the sidewall 200 may include any number of plates. The core reductions along the top edge 302 and bottom edge 301 are spaced apart from the pocket 244, with an increased core thickness being disposed between the core reduction the plates 308, 312 is separated from the pocket 244, preventing the plate 308, 312 from coming into contact with a logistics insert 226. The interior skin segments 280 may be flush with the plates 308, 312 such that the core 204 is not recessed at the plates 308, 312, although, in additional embodiments, the plates 308, 312 may include additional recessed, or displaced sections to accommodate for the plates 308, 312. In constructions where the cargo body upper and lower rails are secured to the panel of the sidewall with fasteners that extend through the core 204 and/or skins 208, 212, the plates 308, 312 provide enhanced fastener retention.

FIG. 11 further illustrates an alternate style of logistics insert 226 to that of the logistics insert 126 shown in the embodiment of FIG. 7. Such logistics inserts 226 can be commercially available from Ancra International. The logistics insert 226 has a non-flat extrusion profile, including a central track 316, along which there are provided rounded (e.g., semi-circular) widenings 320 at regular intervals. The logistics insert 226 includes a central portion 324 and wings or flanges 328, which are recessed into the sidewall 100. An alternate style of logistics insert (not shown) that can be used at some or all of the locations of the logistics inserts 226 shown in the preceding figures may include a non-flat extrusion profile, with a central portion and two peripheral wings or flanges, with parallel tracks defined therebetween. The central portion can include a row of apertures for logistics fittings. Although the flanges are recessed into the sidewall recesses 224, the central portion may be further recessed, and may even be recessed a majority of the way, or entirely, through the core 204 to the exterior skin 212. Interior surfaces of the logistics insert can be flush with the interior surface of the interior skin 208.

The logistics insert 226 is configured to fit within the recess 224 such that, when the logistics insert 226 is fitted within the recess 224, the recessed first edge 288 and the recessed second edge 292 of the interior skin segments 260 form a surface which supports the logistics insert 226, particularly wings or flanges 328 of the logistics insert 226. Alternatively or additionally, a surface of the core 204 may act as a surface which supports the logistics insert 226. A portion of the logistics insert 226 may be disposed within the pocket 244, with the exterior skin 212 forming a barrier between the logistics insert 226 and the exterior of the panel 200. In the depicted embodiment, the central portion 324 and the central track 320 are disposed within the pocket 244. In some embodiments, the logistics insert 226 may be in contact with the exterior skin 212. Alternatively, the logistics insert 226 may be spaced apart from the exterior skin 212.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims. Various features of the invention are set forth in the following claims.

What is claimed is:

1. A method of manufacturing a cargo body panel, the method comprising:
   laying an exterior side of an exterior skin down on a platen such that an interior side of the exterior skin faces upward;
   laying an exterior side of a core onto the interior side of the exterior skin, the core having a maximum thickness throughout a majority thereof, the core further provided with an interior side having a plurality of recesses having a reduced-thickness compared to the maximum core thickness;
   laying an exterior side of an interior skin onto the interior side of the core; and
   performing a molding step in which the exterior and interior skins are bonded to the exterior and interior sides of the core, respectively, and in which the interior skin is shaped to conform to the plurality of recesses in the core.

2. The method of claim 1, further comprising shaping the core during the molding step.

3. The method of claim 1, wherein the molding step includes vacuum molding.

4. The method of claim 1, wherein the cargo body panel is manufactured as a complete jointless sidewall for a cargo body.

5. The method of claim 4, wherein the interior skin is provided in a single, continuous piece spanning the interior side of the core.

6. The method of claim 4, wherein the exterior skin is provided in a single, continuous piece spanning the exterior side of the core.

7. The method of claim 1, wherein a plurality of assembly plates are positioned along at least one peripheral edge of the core prior to the molding step, the plurality of assembly plates being recessed into the core on one or both of the core's interior and exterior sides.

8. The method of claim 1, further comprising CNC-machining the core prior to laying its exterior side onto the interior side of the exterior skin.

9. The method of claim 1, further comprising laying a plurality of logistics inserts onto an interior side of the interior skin in register with the plurality of recesses in the core, and attaching the plurality of logistics inserts such that they are at least partially nested into the plurality of recesses.

10. The method of claim 9, wherein the plurality of logistics inserts are laid onto the interior side of the interior skin prior to the molding step, such that the interior skin is shaped to conform to the plurality of recesses in the core by the plurality of logistics inserts.

11. The method of claim 9, wherein a portion of each of the plurality of logistics inserts is laid against the interior side of the exterior skin.

12. A method of manufacturing a cargo body panel manufactured as a complete jointless sidewall for a cargo body, the method comprising:
    laying an exterior side of an exterior skin down on a platen such that an interior side of the exterior skin faces upward;
    laying an exterior side of a core onto the interior side of the exterior skin, the core having a maximum thickness throughout a majority thereof, the core further provided with an interior side having a plurality of recesses having a reduced-thickness compared to the maximum core thickness;
    laying an exterior side of an interior skin onto the interior side of the core; and
    performing a molding step in which the exterior and interior skins are bonded to the exterior and interior sides of the core, respectively,
    wherein the interior skin is provided in a single, continuous piece spanning the interior side of the core.

13. The method of claim 12, further comprising shaping the core during the molding step.

14. The method of claim 12, wherein the molding step includes vacuum molding.

15. The method of claim 12, wherein the exterior skin is provided in a single, continuous piece spanning the exterior side of the core.

16. The method of claim 12, wherein a plurality of assembly plates are positioned along at least one peripheral edge of the core prior to the molding step, the plurality of assembly plates being recessed into the core on one or both of the core's interior and exterior sides.

17. The method of claim 12, further comprising CNC-machining the core prior to laying its exterior side onto the interior side of the exterior skin.

18. The method of claim 12, further comprising laying a plurality of logistics inserts onto an interior side of the interior skin in register with the plurality of recesses in the core, and attaching the plurality of logistics inserts such that they are at least partially nested into the plurality of recesses.

19. The method of claim 18, wherein the plurality of logistics inserts are laid onto the interior side of the interior skin prior to the molding step, such that the interior skin is shaped to conform to the plurality of recesses in the core by the plurality of logistics inserts.

20. The method of claim 18, wherein a portion of each of the plurality of logistics inserts is laid against the interior side of the exterior skin.

* * * * *